(12) United States Patent
Murata (10) Patent No.: US 7,068,922 B2
(45) Date of Patent: Jun. 27, 2006

(54) DVD VIDEO PLAYER

(75) Inventor: Mitsuhiro Murata, Iwaki (JP)

(73) Assignee: Alpine Electronics, In., Tokyo (JP)

( * ) Notice: Subject to any disclaimer, the term of this patent is extended or adjusted under 35 U.S.C. 154(b) by 1158 days.

(21) Appl. No.: 09/827,737

(22) Filed: Apr. 6, 2001

(65) Prior Publication Data

US 2001/0038743 A1    Nov. 8, 2001

(30) Foreign Application Priority Data

Apr. 10, 2000   (JP)   .............................. 2000-107414

(51) Int. Cl.
*H04N 5/85* (2006.01)
(52) U.S. Cl. ...................... 386/125; 386/126
(58) Field of Classification Search .................. 386/46, 386/95, 125, 126
See application file for complete search history.

(56) References Cited

U.S. PATENT DOCUMENTS

| | | | |
|---|---|---|---|
| 5,654,946 A | 8/1997 | Kim et al. | 369/32 |
| 5,701,282 A * | 12/1997 | Matsumoto et al. | 369/30.04 |
| 6,832,040 B1 * | 12/2004 | Sakuramoto et al. | 386/95 |

* cited by examiner

*Primary Examiner*—Huy Nguyen
(74) *Attorney, Agent, or Firm*—Brinks Hofer Gilson & Lione (57) ABSTRACT

A DVD video player includes first and second memories, which are nonvolatile, for storing data indicating the operating state of the DVD video player therein via a memory selecting unit, an end-of-writing detecting unit for detecting completion of the writing for each of the first and second memories, a last-written memory storage unit, which is nonvolatile, for storing data indicating the memory of the first and second memories to which writing is to be applied when completion of writing is detected by the end-of-writing detecting unit, and a writing-memory selecting unit for, after writing to the indicated memory is completed, causing the memory selecting unit to switch from the indicated memory to the other memory. In the DVD video player, when power for the DVD video player is turned on, data indicating the last play state from the memory is selected based on data stored in the last-written memory storage unit and read.

17 Claims, 7 Drawing Sheets

DVD VIDEO PLAYER

BACKGROUND OF THE INVENTION

1. Field of the Invention

The present invention relates to a DVD (Digital Versatile Disc) video player provided with a play-position function in which, when the power is turned off during playback, the last play position is stored, and then when the power is turned on again, playback can be resumed from the last stored play position.

2. Description of the Related Art

Recently, with the help of the MPEG 2 (Moving Pictures Experts Group) data-compression method, the art for storing video information such as a long movie or TV program on a DVD has been advanced such that a considerable amount of data can be stored on a small disc. DVD video players for playing back this type of DVD have been widely used. Since a DVD can contain long videos, users often have to stop the DVD video player in the middle of playback, and afterwards, resume from where the user last stopped.

Where a CD is used as a conventional small storage medium, CD players are provided with a memory for storing a play position in order to deal with this stopping situation. When the power is turned off during playback, CD players store the last play position in the memory. Thereafter, when the power is turned on again, CD players read the last play position from the memory and thus cause a pickup to move to the last stored play position, so that the CD players resume playing back the CD from where the CD was last stopped.

A memory function for storing the last play position when the power is turned off during playback and then resuming from the last stored play position read from the memory when the power is turned on again, is called a "play-position memory" (PPM) function. In the above-described CD players installed in a vehicle, the CD players are turned on and off due to the on/off operation of the main unit power source of the CD player. In addition, the CD players are sometimes turned on and off, at a part that is closer to the power source of the vehicle, by means of an accessory switch (Acc switch) that is operated by a key. In either case, the CD players can be effectively operated.

An actual circuit construction for realizing the above play-position function is considered as follows. The memory is connected to a system control device for controlling the whole system including each component of the player. Disconnection from the power is detected by, for example, a drop in the power-supply voltage, which activates the system control device. The activation of the system control device, at the time of detecting the voltage drop, causes the play position of the disc being played back to be stored in the memory. Thereafter, when the power is turned on again, the last play-position stored in the memory is read.

However, in a circuit having the above-described construction, when the system control device and mechanisms and other circuits of the player share a power supply, turning off the power supply causes the system control device to be simultaneously disconnected. When the play position is being written into the memory at this time, the voltage applied to a CPU may be lower than the CPU's operational voltage. When this occurs, storage of the current data becomes incomplete. A mixture of current data to be stored and previously stored data may occur, which leads to abnormal data. Particularly in an audio device installed in a vehicle, the power on-off switch of each device connected to the audio device is provided, and the accessory switch is provided as the key switch in a part which is closer to the power supply side. When the user exits the vehicle leaving the audio device turned on, the user will most likely turn off the accessory switch directly without turning off the audio devices and the like. Therefore, the above-described case often occurs.

As a measure for this case, in the CD player, another power system is provided for the CPU that controls the whole player so as to be isolated from the main power system of other mechanisms and circuits. Furthermore, the voltage drop caused by the power-off operation or the like applied to the player and the like is detected by constantly monitoring the power supply voltage across the main power system. When a voltage drop is detected, the last play position is stored in the memory. In an appropriate elapse of time after completion of the storage, the power supplied to the CPU is disconnected. Accordingly, even though the power is abruptly turned off during playback of the CD, the last play position can be successfully stored. Thereafter, when the power is turned on again, playback can be successfully performed from the last play position.

The same consideration is applied to DVD players. Current DVD players adopt a construction in which the power system for the DVD player system control device is shared with the power system for the entirety thereof. Accordingly, when the power-off occurs in the above-described manner, since the operation voltage across the system control device is reduced while the last play position is being written in the memory, storing data in the memory fails. This means that the play-position memory function may not perform appropriately.

To deal with this, by applying the same measure as in the CD player to the DVD player, another power system for the system control device which is isolated from the power system for other mechanisms and circuits is provided, and the power system for the system control device is turned off after all necessary data is stored in the memory.

However, if the control device that performs the above-described play-position function adopted by the CD player was desired to be embedded into the conventional DVD player, the power system design would have to be drastically changed. In addition, this change may affect other control units, thereby requiring a modification of the entire DVD player.

SUMMARY OF THE INVENTION

Accordingly, it is a major object of the present invention to provide a DVD video player for positively storing the last operation state such as the last play position at the time of a power-off, and then for easily reading the last stored operation state to resume playback from the last play position at the time of a power-on by only attaching a simple device to a conventional DVD player system, and without causing a drastic change in this conventional DVD player system.

To this end, according to a first aspect of the present invention, there is provided a DVD video player including first and second memories, which are nonvolatile, for storing data indicating the operating state of the DVD video player therein via a memory selecting unit, an end-of-writing detecting unit for detecting completion of the writing for each of the first and second memories, a last-written memory storage unit, which is nonvolatile, for storing data indicating the memory of the first and second memories to which writing is to be applied when completion of writing is detected by the end-of-writing detecting unit, and a writing-memory selecting unit for, after writing to the indicated memory is completed, causing the memory selecting unit to switch from the indicated memory to the other memory. In the DVD video player, when power for the DVD video player is turned on, data indicating the last play state from the memory, selected based on data stored in the last-written memory storage unit, is read.

In the above described embodiment, a DVD video player can be provided for successfully storing the last operation state at the time of a power-off, and then for easily reading the last stored operation state to resume playback using the last playback state at the time of a power-on by only attaching a simple device to a conventional DVD player system, and without causing a drastic change in the conventional DVD player system.

The data written to the indicated memory may include play-position data in DVD video data. Accordingly, playback can be resumed from the last play position at the time of a power-on.

The data written to the indicated memory may include disc identification data in DVD video data. Accordingly, the last used DVD video disc can be identified at the time of a power-on. For example, when a DVD disc changer is used, the last used disc can be selected. In addition, when the DVD video disc player which plays back a single DVD video disc is used, it can be determined whether a DVD video disc to be played back is the DVD video disc that is last played back.

The data written to the indicated memory may include playback-mode data of the DVD video player. Accordingly, at the time of a power-on, playback can be resumed using the last used playback-mode selected from among a fast-forward playback mode, a rewinding playback mode, a pause playback mode, and the like.

According to a second aspect of the present invention, a DVD video playback method includes the acts of writing playback-state data alternately to nonvolatile first and second memories whenever the play-back state of a DVD video player changes during playback of a DVD video disc, and storing, in a nonvolatile last-written memory storage unit, data indicating the memory of the first and second memories to which writing is to be applied when writing to each of the first and second memories is complete, and reading the playback-state data from the memory of the first and second memories indicated by the data stored in the last-written memory storage unit when power for the DVD video player is turned on, whereby the DVD video disc is played back based on the read playback-state data.

Further objects, features, and advantages of the present invention will become apparent from the following description of the preferred embodiments with reference to the attached drawings.

DESCRIPTION OF THE PREFERRED EMBODIMENTS

Figure 1:
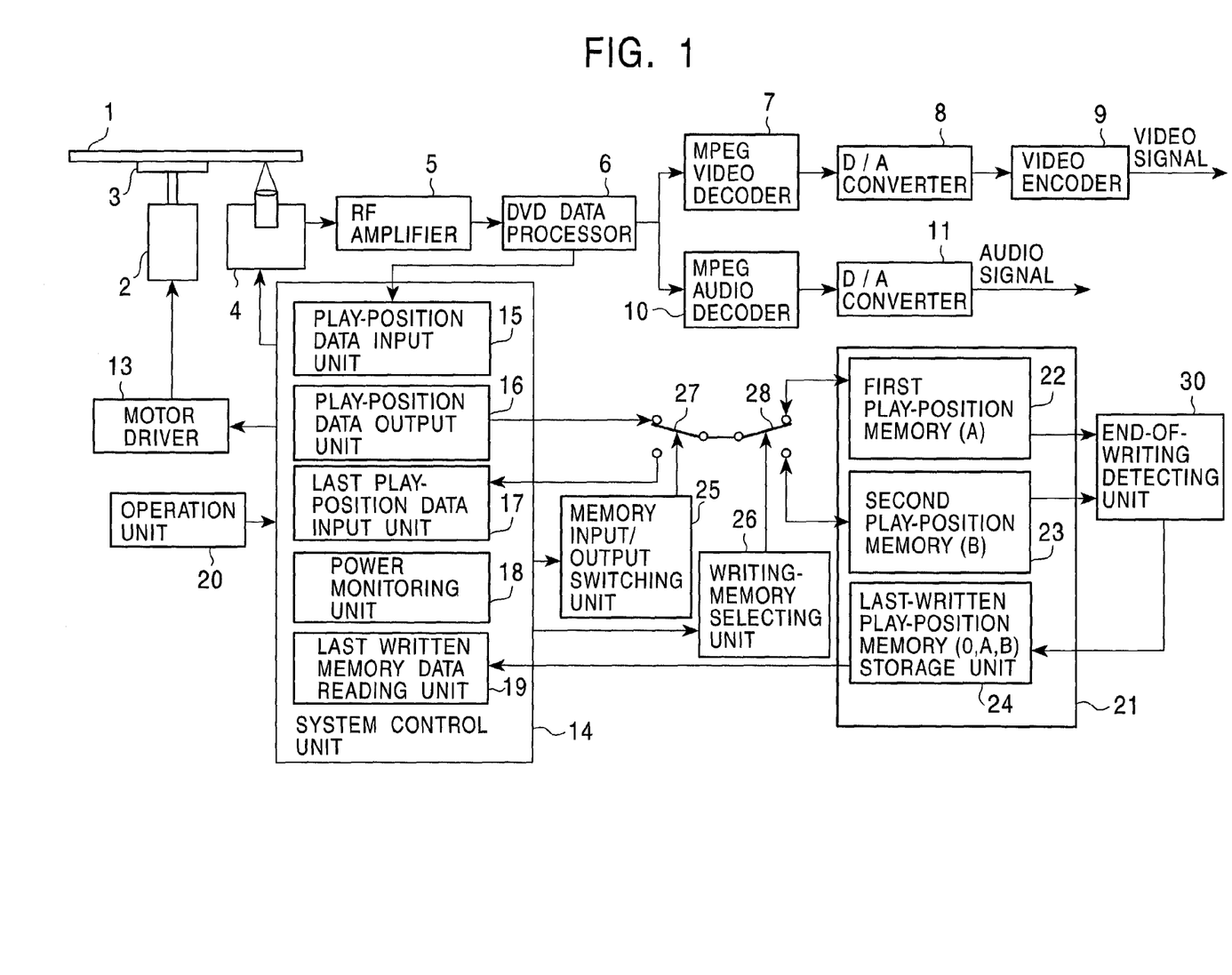
FIG. 1 is a block diagram showing the function construction and the interrelationship among components of a basic embodiment of the present invention.

FIG. 1 is a function block diagram primarily illustrating a function for realizing a play-position function in a DVD video player according to the present invention. A DVD video disc 1 is fixed to a table 3 rotated by a spindle motor 2 so that the rotation is controlled at a predetermined speed. An optical pickup 4 is provided facing a storage layer formed on the bottom face of the DVD video disc 1. A semiconductor laser beam that focuses on a predetermined position via an objective lens from the optical pickup 4 is irradiated and the laser beam reflected from the DVD video disc 1 is received at a photodiode via the objective lens, so that an RF signal stored on the disc is read.

This RF signal is amplified by an RF amplifier 5 and is input into a DVD data processor 6. The DVD data processor 6 decodes MPEG data. In addition, the DVD data processor 6 performs various digital signal processing tasks, such as error-correction processing, separating processing on MPEG video data from MPEG audio data, and extracting processing on the below-described various management information and address information. An MPEG video decoder 7 decodes MPEG-2 format image data based on the MPEG video data separated by the DVD data processor 6.

The decoded video data is sent to a digital-analog converter 8 to generate a luminance signal Y and color-difference signals Cb and Cr. Furthermore, a video encoder 9 makes these luminance signals Y and difference signals Cb and Cr into a video signal (NTSC or PAL). The MPEG audio decoder 10 decodes MPEG-2 formatted audio data based on MPEG audio data separated by the DVD processor 6. A digital-analog (D/A) converter 11 converts this decoded audio data into an analog audio signal.

Figure 6:
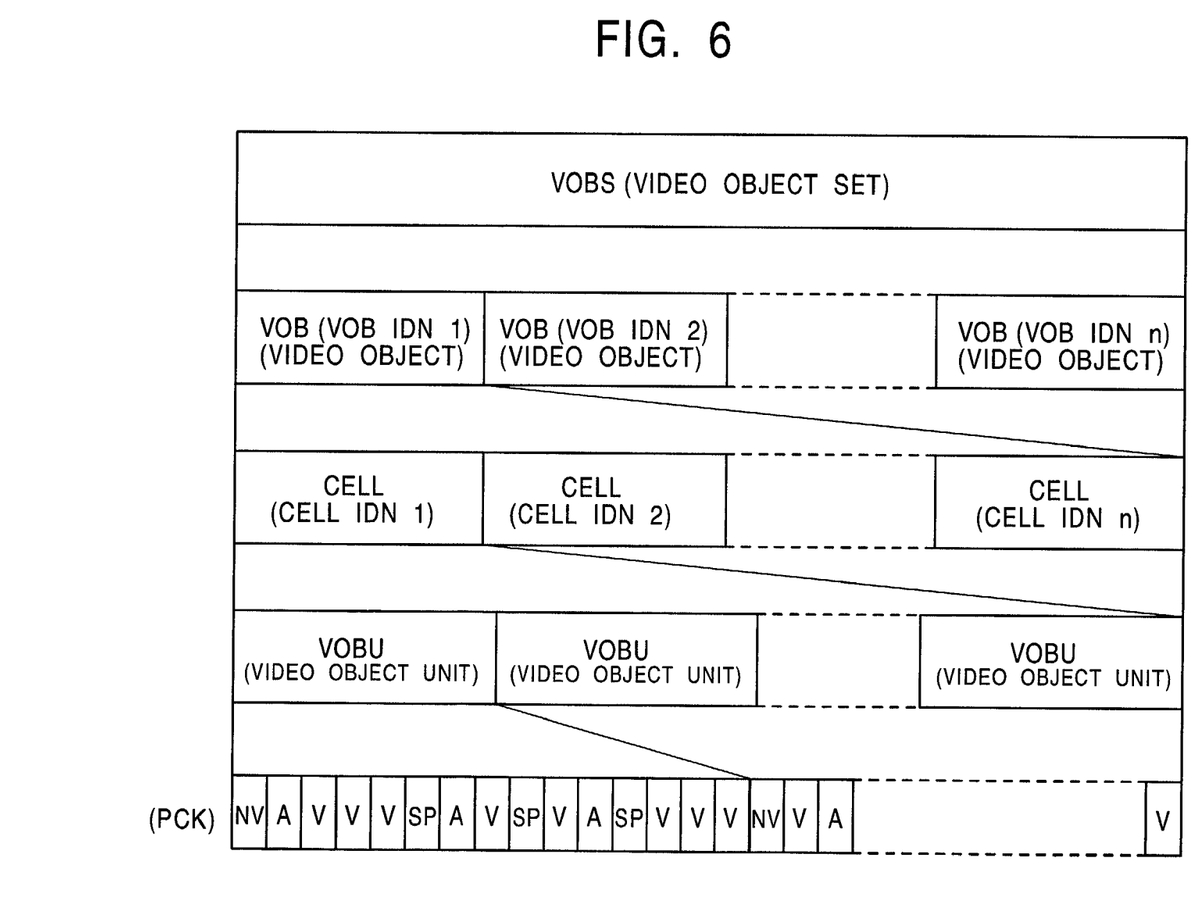
FIG. 6 is a data structure diagram illustrating an example DVD video data format.

Data stored in the DVD video disc 1 is formatted according to a predetermined format standard, such as shown in FIG. 6. When the content stored in this DVD is a movie, a video object set (VOBS) which is a package of this movie is a storage unit. This VOBS includes a plurality of video objects (VOB) which is managed as a group of storage data. Furthermore, this VOB includes a set of Cells, each of which is a unit such as a scene or a cut from a movie. It takes from several minutes to several tens of minutes to play back this Cell.

Each Cell includes a plurality of video object units (VOBU), each of which has the order of the total playback time 0.4 to 1.2 seconds of data stored therein. This VOBU includes a plurality of a group of pictures according to a MPEG-2 format. In addition, VOBU includes as follows: a navigation pack (NV pack: NV-PCK) having information for managing VOBU; a video pack (V pack: V-PCK) having main video data; an audio pack (A pack: A-PCK) having audio data; and a sub-picture pack (SP pack: SP-PCK) having sub-picture data such as subtitles.

Each VOBU is managed based on data for the management pack which is called the NV pack. For managing the overall VOBU data, the NV pack includes the playback time of the VOBU as well as the size of VOBU whose playback is controlled using the NV pack. In addition, the NV pack includes various management data such as the address of this NV pack, the category of VOBU, and control information on user operations, and the elapsed time from the top of the Cell including this VOBU.

Figure 7:
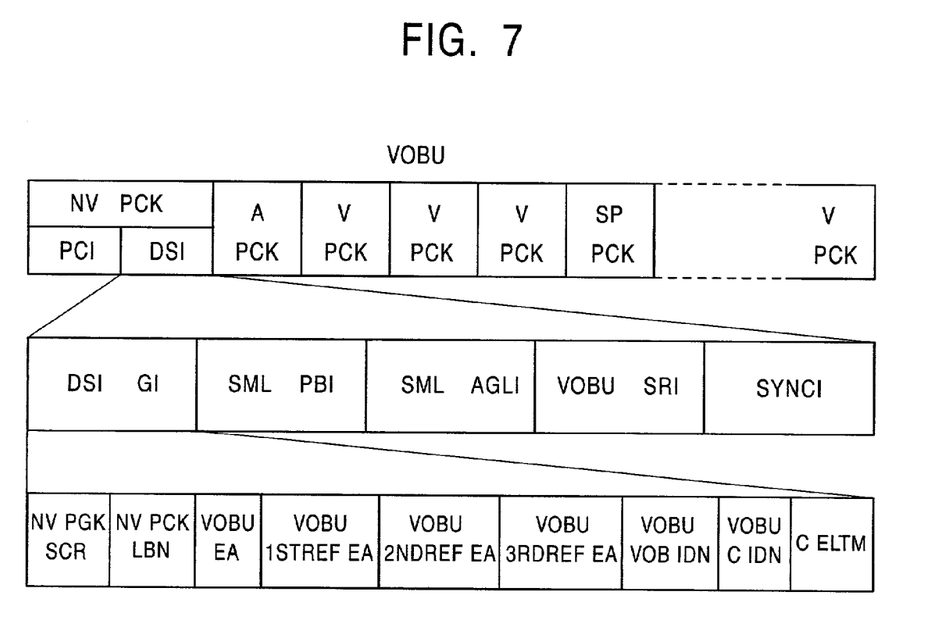
FIG. 7 is a data structure diagram illustrating data stored in VOBU.

As shown in FIG. 7, the NV pack includes presentation control information (PCI), which is video data display control information, and data search information (DSI), which is search information. PCI includes management information on the entirety of PCI, angle switching information in the case of non-seamless video, information for displaying sub-picture data and the like in a predetermined region in a highlighted manner when the subpicture data and the like are displayed, and recording information having the main video data, the sub-picture data, and the audio data. DSI includes management information (DSI, GI) on the entirety of DSI, playback management information (SML PBI) in the case of seamless, angle information (SML AGLI) in the case of seamless, VOBU search information (VOBU SRI) on time intervals between VOBUs and the like, and synchronization information (SYNCI) indicating synchronization with audio data and the sub-picture data.

The DSI management information (DSI GI) includes a system clock reference (NV, PGK, SCR) of the NV pack, the address (NV PCK LBN) of the NV pack, various data on VOBU such as the end address (VOBU EA) of VOBU, and the elapsed time (C ELTM) from the top of the Cell including this VOBU. Accordingly, by reading this management information, the current play position can be obtained in VOBU units which each contain 0.4 to 1.2 seconds of data.

A system control unit 14 shown in FIG. 1 controls each component of the DVD player in an integrated manner. Particularly in a first embodiment, the system control unit 14 is provided with a play-position data input unit 15 for inputting management information in the DVD data obtained by the DVD data processor 6 for playing back the DVD video disc. In another embodiment, disc identification data may serve as input for identifying each DVD video disc.

The system control unit 14 further includes a play-position data output unit 16 for outputting data from the play-position data input unit 15 to a play-position memory (PPM) 21. When the power monitoring unit 18 detects that the power is turned on after the power is turned off, data stored in the PPM 21 is transferred to a last play-position data input unit 17 in the below described manner. In addition, a last-written memory data reading unit 19 is provided for requesting data stored in the last-written play-position memory storage unit 24 of the PPM 21.

In order to control a motor driver 13, the system control unit 14 outputs a signal to the motor driver 13 which drive-controls the spindle motor 2. In addition, the system control unit 14 outputs a signal to the optical pickup 4 for performing a normal play-position specification as well as a play-position specification using the PPM 21 according to the present invention. Operation unit 20 is connected to the system control unit 14. Various requests from the user and, if necessary, a power on-off signal are inputted into the system control unit 14.

The PPM 21 includes a first play-position memory (A) 22 and a second play-position memory (B) 23 for storing the play position of the DVD video data currently being played back. When a memory input/output switching unit 25 causes a memory input/output switching device 27 to be switched in a manner as shown in FIG. 1, a writing-memory selecting unit 26 is arranged so that the current play position data is outputted from the play-position data output unit 16 of the system control unit 14 to the play-position memory (the first play-position memory 22 in FIG. 1) on the side which the writing-memory selecting unit 26 causes the memory selecting device 28 to select. The size of each of the play-position memories 22 and 23 is appropriately determined in accordance with the size of data to be stored and the initial values thereof are appropriately determined in accordance with information to be stored. These play-position memories 22 and 23, as well as a last-written play-position memory storage unit 24 (described below), are constructed using a nonvolatile SRAM (Static Random Memory) so that data stored in these memory units can be retained even after the power is turned off.

When the current play position data is written to one of the play-position memories 22 and 23, an end-of-writing detecting unit 30 detects completion of the writing operation. Data indicating which of the play-position memories 22 and 23 play-position data is successfully written is stored in the last-written play-position memory storage unit 24. Since data stored in this last-written play-position memory storage unit 24 may need only three symbols for: no data or undefined data; the first play-position memory 22 (symbolized as e.g., "A"), and the second play-position memory 23 (symbolized as e.g., "B"), a processing unit may be one which the CPU can easily handle, for example, one byte or one word. The initial value of this data is "no data".

The system control unit 14 includes the last-written memory data reading unit 19. The last-written memory data reading unit 19 reads the data stored in the last written play-position memory storage unit 24 of the PPM 21 to identify the last written play-position data using the above-described symbol. This activates the writing-memory selecting unit 26 to cause the memory selecting device 28 to switch so that the system control unit 14 is connected to the other play-position memory. Accordingly, during playback, data indicating the play-position can be alternatively written to either of the play-position memories 22 or 23 in accordance with the data stored in the last written play-position memory storage unit 24.

When the power is turned on, the last-written memory data reading unit 19 of the system control unit 14 reads data stored in the last-written play-position memory storage unit 24, such as the symbol corresponding to each play-position memory and identifies the last stored play-position memory in the previous playback. The writing-memory selecting unit 26 is activated and causes the memory switching device 28 to select the play-position memory containing the last stored play-position. At this time, the system control unit 14 controls the memory input/output switching unit 25 so that the memory selecting device 27 is connected to the last play-position data input unit 17. This enables the play-position memory data on the side selected in the above-described manner to be inputted.

Figure 4:
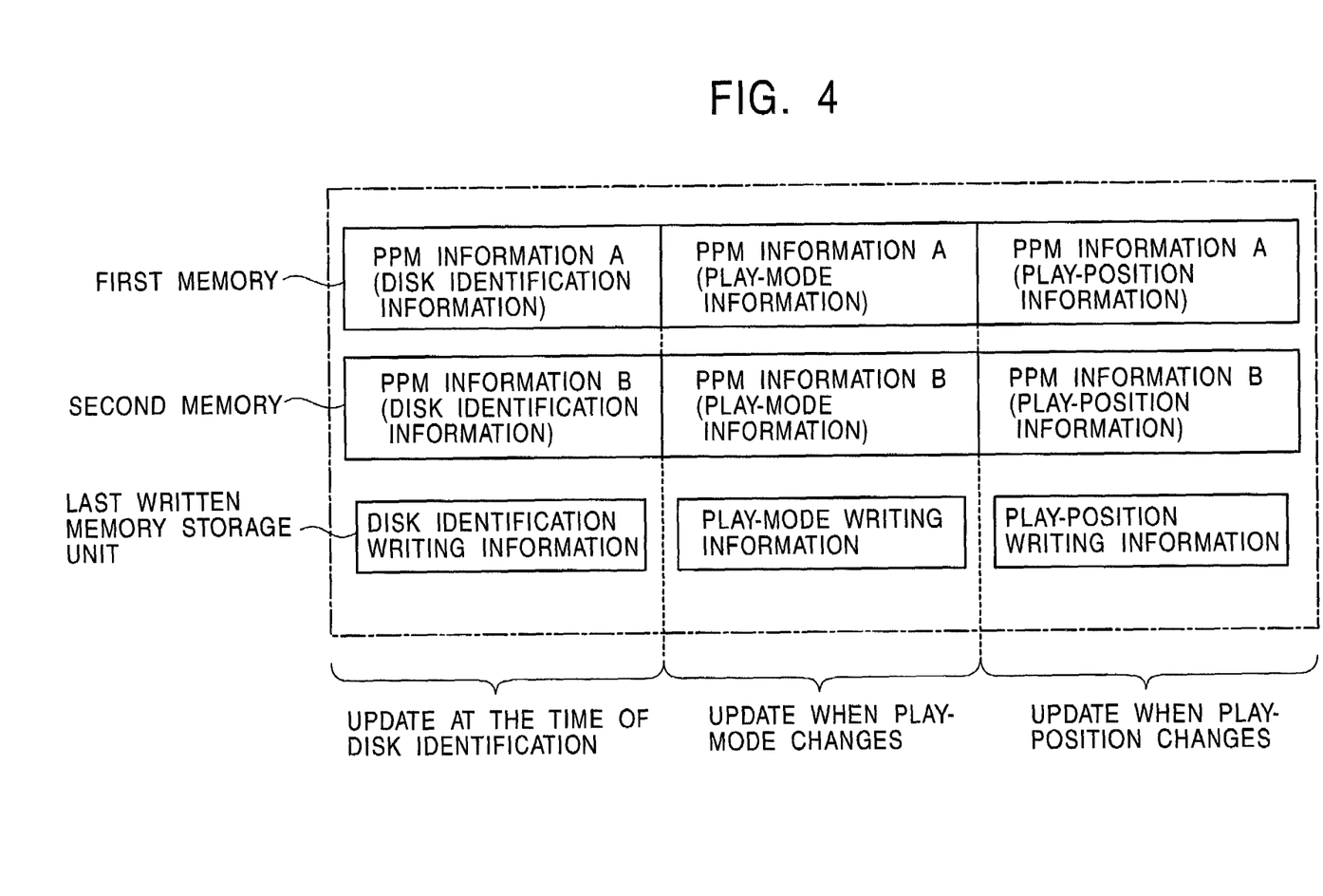
FIG. 4 is an illustration showing a PPM memory configuration according to another embodiment.
Figure 5:
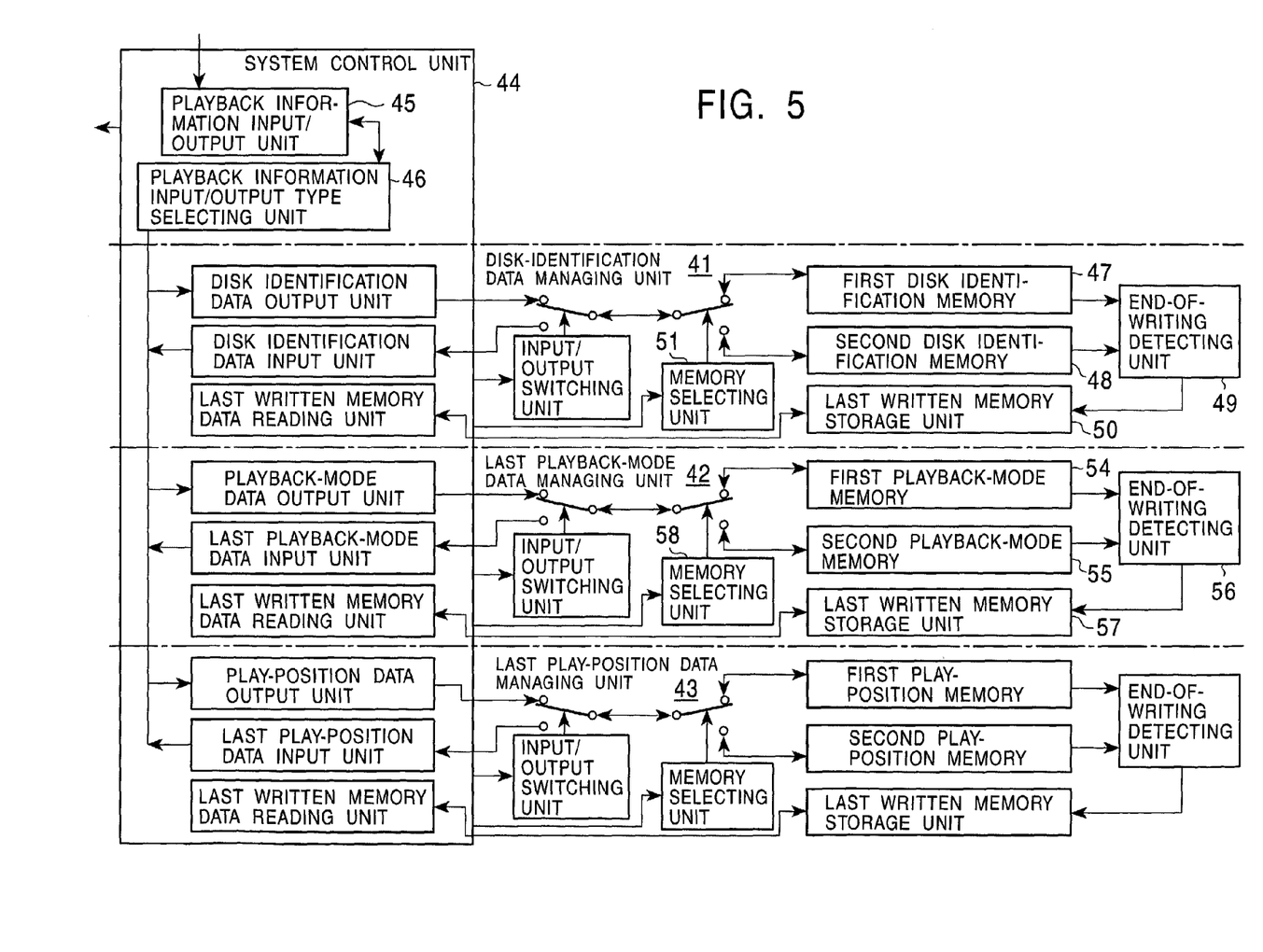
FIG. 5 is a block diagram in the proximity of a system control unit and a PPM of the embodiment shown in FIG. 4.

When a function for storing various last play states is further included as shown, for example, in FIGS. 4 and 5, the function can be realized, based on the stored data, in the same construction by connecting the above construction in parallel with the PPMs, the memory selecting unit, and the like, which are equivalent to the counterparts shown in FIG. 1.

Figure 2:
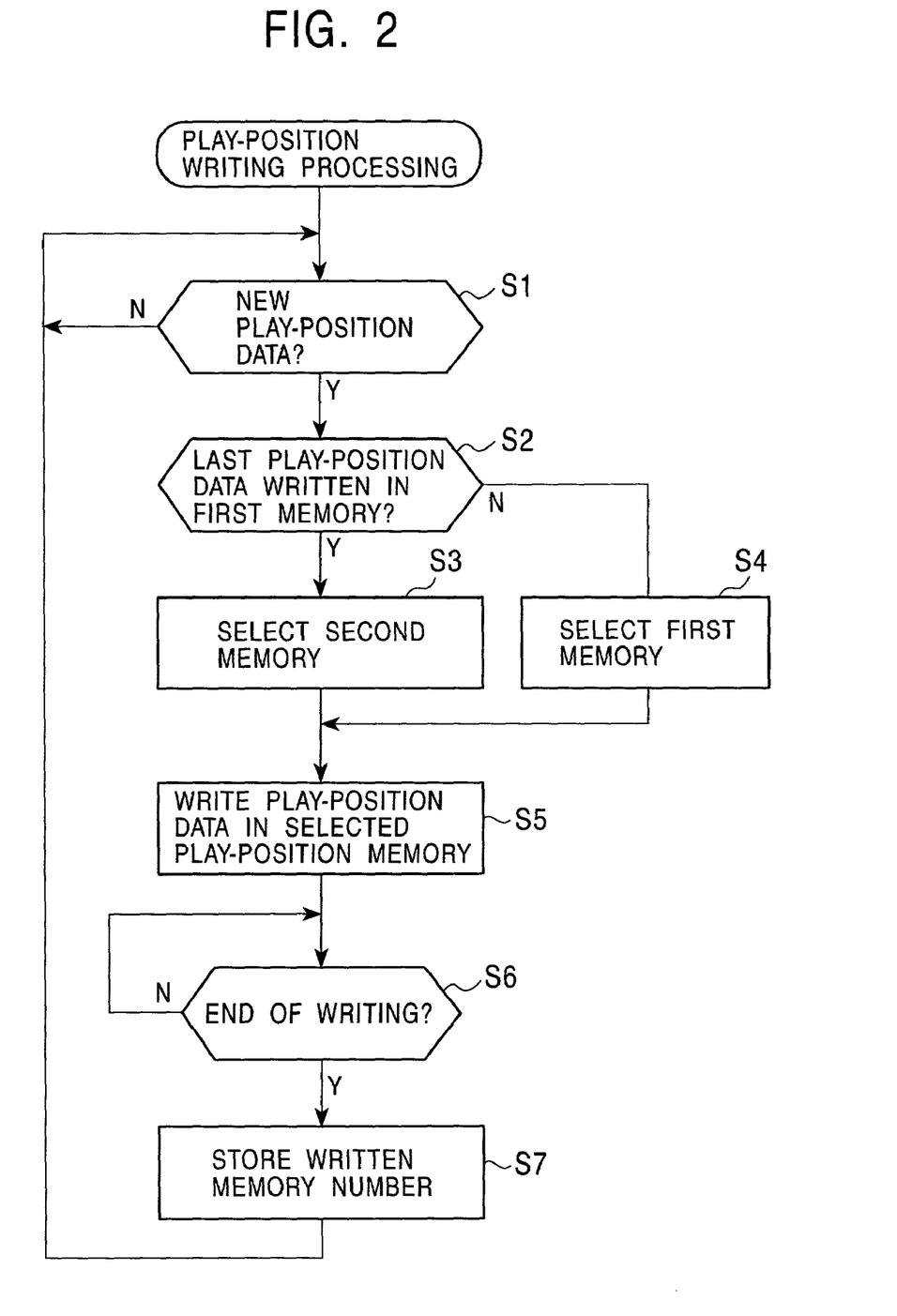
FIG. 2 is a flowchart of play-position writing processing according to the above embodiment.

FIG. 2 shows a flowchart showing a procedure for writing the last play position to the memory during playback in the DVD player according to the embodiment shown in FIG. 1. The play-position data input unit 15 obtains data indicating a new play-position out of the management information in VOBU of the DVD video data updated by the DVD data processor 6 every 0.4 to 1.2 seconds (act S1). The last-written memory data reading unit 19 of the system control unit 14 accesses the last-written play-position memory storing unit 24 and determines whether the last written play-position memory is the first play-position memory (for example, whether the stored data is the symbol "A") by reading the last written play-position memory information (act S2).

When the symbol "A" is stored, since next input play-position data is stored in the second play-position memory 23, the system control unit 14 activates the writing-memory selecting unit 26 to cause the memory selecting device 28 to switch so that data can be input to the second play-position memory (act S3). When the symbol "B" or "NO DATA" (which means neither "A" nor "B") is stored, the system control unit 14 controls the writing-memory selecting unit 26 so that data is input into the first play-position memory 22 (act S4).

Since the symbol "NO DATA" is an initial value, when a new DVD video disc is loaded into the DVD player, the first play-position memory 22 is automatically selected. When, for example, the power is turned off while data is being written to the last-written play-position memory 24, even though storage of the data in the last-written play-position memory 24 is incomplete, the first play-position memory 22 is automatically selected. Thereafter, using the first play-position memory 22 as a reference, the play-position data is alternately stored in each play-position memory.

A newly read play-position is written to the play-position memory switched to and selected in the above-described manner (act S5). Thereafter, when the end-of-writing detecting unit 30 detects completion of the writing (act S6), a symbol, such as "A", or "B", corresponding to the last written play-position memory is written to the last written play-position memory storage unit 24 (act S7). The process returns to acts S1 and repeats.

Whenever a new VOBU is played back from among DVD data in playback, processing for writing the data position alternately to the two play-position memories repeats. Accordingly, even when, due to, for example, disconnection from the power during playback, writing the play position is incomplete, which mixes up previous data and current data in the last play-position memory, the other play-position memory contains play-position information that is 0.4 to 1.2-seconds older than the last play-position information. When writing the data to the last play-position memory is incomplete, because the end-of-writing detecting unit 30 does not detect the end of writing, the symbol corresponding to the other play-position memory is stored in the last-written play-position memory storage unit 24.

After the power is turned off while the DVD player is in use, the power is turned on in order to play back the last used DVD disc again. The following processing is performed in accordance with the operation flowchart shown in FIG. 3. That is, the previously last stored play-position data is read from the memory and playback processing is performed from this position. When the power monitoring unit 18 of the system control unit 14 detects that the power is turned on (act S11), the system control unit 14 causes the memory input/output switching unit 25 to switch the memory input/output selecting device 27 to the last play-position data input unit 17, so that the content of the PPM 21 can be inputted into the system control unit 14 in the below-described manner.

Figure 3:
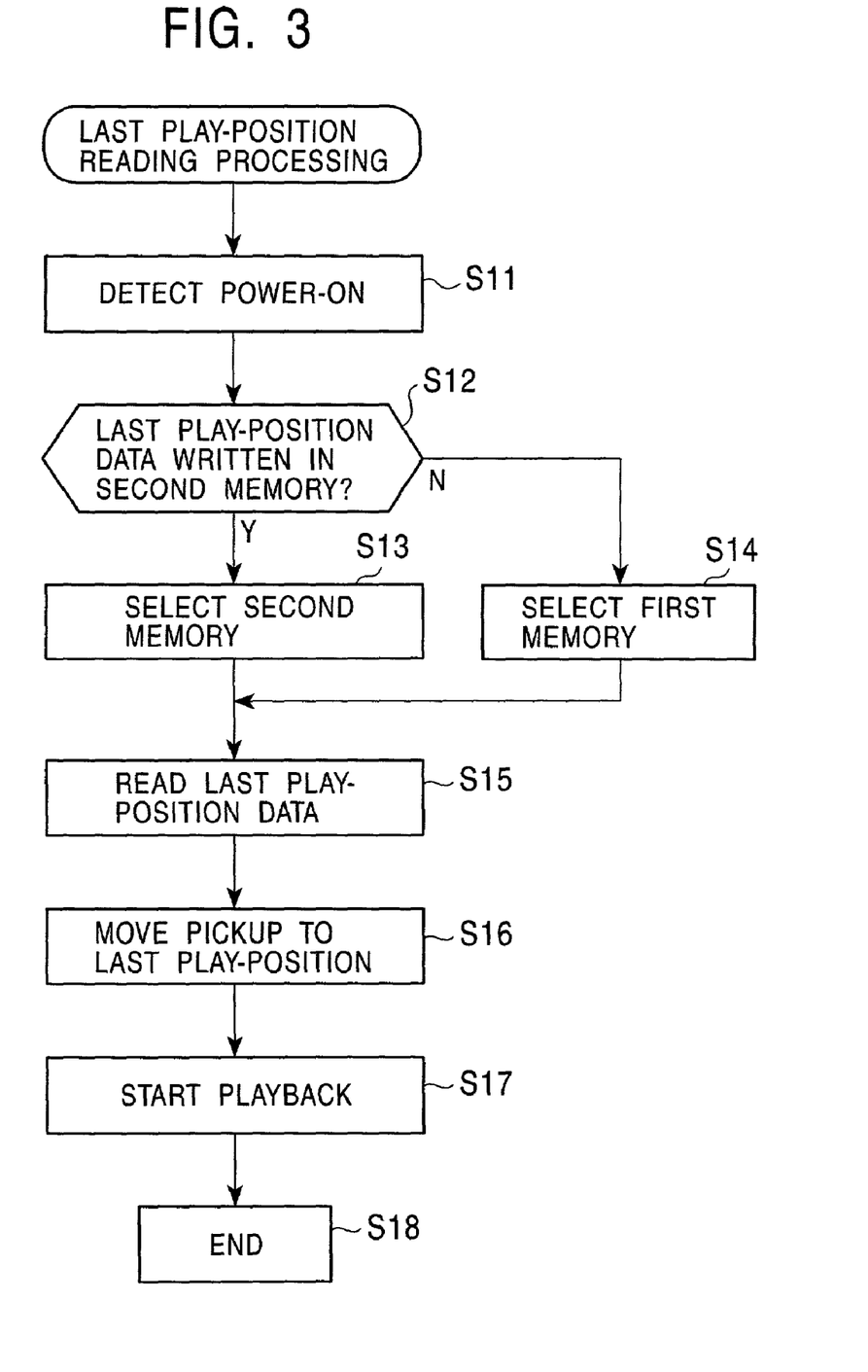
FIG. 3 is a flowchart of last play-position reading processing according to the above embodiment.

The last written memory data reading unit 19 reads the last stored play-position memory data stored in the last written play-position memory storage unit 24 and determines whether the last stored play-position memory is the first play-position memory or the second play-position memory (act S12). When, for example, the symbol "B" is stored in the last-written play-position memory storage unit 24 and the data stored in the second play-position memory 23 is determined as the last play position, the memory selecting device 28 is switched so as to be connected to the second play-position memory 23 (act S13), whereby this data can be outputted to the last play-position data input unit 17 of the system control unit 14.

When, for example, the symbol "A" is stored in the last-written play-position memory storage unit 24 and the data stored in the first play-position memory 22 is determined as the last play-position, the memory selecting device 28 is switched so as to be connected to the first play-position memory 22 (act S14), whereby this data can be output to the last play-position data input unit 17. In this embodiment, when no data or an undefined value is input as initial data, the first play-position memory 22 is selected. However, in this case, the second play-position memory 23 may be set so as to be selected.

When the play-position memory to be read is selected in this manner, the last play-position data input unit 17 reads the data stored in this selected memory (act S15). The system control unit 14 moves the pickup 4 to the last play-position based on the read data (act S16), starts playing back (act S17), and terminates this operation (act S18). By operating in the above-described manner, the previously used DVD can be played back from the last play position.

In the above embodiment, the most fundamental operation example employing the play-position memory function according to the present invention is described. Using the same construction and operation, various forms can be carried out. For example, as shown in FIG. 4, apart from the above play-position information, disc identification information, and playback mode information can be also stored. That is, three sets of PPM units A, B, and C, each of which is the same as shown in FIG. 1, are provided: A is used for the disc identification; B is used for storing the playback mode information; and C is used for storing the play position information in the same manner as in the above embodiment.

In yet another embodiment, each set is similarly provided with the first memory, the second memory, and the last-written memory storage unit for storing data indicating which memory stores the last play position. In the memory configuration, the first and second memories are allocated in a successive storage region. Alternatively, each memory can be separately allocated.

A DVD video player provided with such a PPM unit can be operated using the function construction block shown, for example, in FIG. 5. FIG. 5 shows the block construction in the proximity of a part corresponding to the system control unit 14 and the PPM memory unit 21 in FIG. 1. This DVD video player includes a disc-identification data managing unit 41, a last playback-mode data managing unit 42, and a last play-position data managing unit 43 (same as the counterpart shown in FIG. 1).

A system control unit 44 is also provided with a function for performing the entire data management and is provided with a playback information input/output unit 45, whereby, as shown in FIG. 1, data from the DVD data processor 6 or data of the motor driver 13 such as the playback mode is inputted and necessary data is outputted to the pickup 4 and the motor driver 13. A playback information input/output type selecting unit 46 of the system control unit 44 outputs the input data to the disc-identification data managing unit 41 where the input data is the disc identification data, to the last playback-mode data managing unit 42 where the input data is the playback-mode data, and to the last play-position data managing unit 43 where the input data is the last play-position data. Thus, each data is selectively output to among those managing units in accordance with the input playback information type. When the last playback state is read at the time of a power-on, data from each managing unit is sequentially read and a series of data is output as driving signals to the pickup 4 and the motor driver 13 in the DVD video player.

Since the function of each of the three data managing units is the same as that of the last play position data management illustrated in FIG. 1, the detailed descriptions thereof are omitted. The identification data of the DVD video disc last played back in the DVD video player is stored in either a first disc identification memory 47 or a second disc identification memory 48. When an end-of-writing detecting unit 49 detects completion of the data storage, data such as the symbol corresponding to the last written memory is stored in a last written memory storage unit 50.

When this data is read at the time of a power-on, a memory selecting unit 51 selects the last written memory and then the data is outputted to the system control unit. When the DVD video player employing, for example, a DVD disc changer is used, the last used disc can be selected and played back. In addition, when the DVD video disc player which plays back a single DVD video disc is used, it can be determined whether a DVD video disc to be played back is the DVD video disc that is last played back.

Motor driver driving data corresponding to the last playback mode of the DVD video player from among the playback modes, such as a normal playback mode, a fast-forward playback mode, a rewinding playback mode, and a pause playback mode is stored in either a first playback-mode memory 54 or a second playback-mode memory 55. When an end-of-writing detecting unit 56 detects completion of the writing, the last written memory information is written to a last written memory storage unit 57. When the data is read at the time of a power-on, a memory selecting unit 58 selects the last written memory side and then the data is outputted to the system control unit 44 side. Other than the above-described data, data to be stored as the playback mode data may include subtitles and dubbing using Japanese and an original language, if necessary. Since the construction of the last play-position data managing unit 43 is the same as that of the counterpart shown in FIG. 1, the description thereof is omitted.

The above function block construction enables the disc identification, the last playback mode data, and the last play position data to be positively stored. When these data are read at the time of a power-on, the last used DVD video disc can be played back in the last playback state from the last play position. In addition, use of this same construction may enable various last playback states to be stored or may enable only one among the various last play back states to be stored.

What is claimed is:

1. A DVD video player comprising:
   first and second nonvolatile memories for storing data indicating the operating state of the DVD video player;
   an end-of-writing detecting unit for detecting completion of the writing the operating state for the first and second memories;
   a last-written nonvolatile memory storage unit for storing data indicating the memory of the first and second memories to which writing is to be applied when completion of writing is detected by said end-of-writing detecting unit; and
   a writing-memory selecting unit for causing a memory selecting means to switch from the indicated memory to the other memory after writing to the indicated memory is completed,
   wherein data indicating the last play state from said memory, selected based on data stored in said last-written memory storage unit is read when power for the DVD video player is turned on.

2. A DVD video player according to claim 1, wherein the data indicating the operating state of the DVD video player comprises play-position data in DVD video data.

3. A DVD video player according to claim 1, wherein the data indicating the operating state of the DVD video player comprises disc identification data in DVD video data.

4. A DVD video player according to claim 1, wherein the data indicating the operating state of the DVD video player comprises playback-mode data of the DVD video player.

5. A DVD video player according to claim 1, wherein the data indicating the operating state of the DVD video player comprises play-position data and disc identification data in DVD video data.

6. A DVD video player according to claim 1, wherein the data indicating the operating state of the DVD video player comprises play-position data in DVD video data and playback-mode data of the DVD video player.

7. A DVD video playback method comprising the acts of:
   writing playback-state data alternately to nonvolatile first and second memories whenever the playback state of a DVD video player changes during playback of a DVD video disc;
   storing data indicating the memory of the first and second memories to which writing the playback state data is to be applied when writing to each of the first and second memories is complete; and
   reading the playback-state data from the memory of the first and second memories indicated by the data stored in a last-written memory storage unit when power for the DVD video player is turned on, whereby the DVD video disc is played back based on the read playback-state data.

8. A DVD video playback method according to claim 7, wherein:
   said playback-state data comprises play-position data in DVD video data; and
   when power for the DVD player is turned on, playback is performed based on the play-position data from where playback is last performed.

9. A DVD video playback method according to claim 7, wherein:
   said playback-state data comprises disc-identification data in DVD video data; and
   when power for the DVD video player is turned on, playback of the last played back DVD is performed based on the disc-identification data.

10. A DVD video playback method according to claim 7, wherein:
    said playback-state data comprises playback-mode data of the DVD video player; and
    when power for the DVD video player is turned on, playback is performed using the last used playback mode based on the playback-mode data.

11. A DVD video playback method according to claim 7, wherein:
    said playback-state data comprises the play-position data in DVD video data and the playback-mode data of the DVD player; and when power for the DVD video is turned on, playback is performed from the last play position using the last playback mode based on the play-position data and the playback-mode data.

12. A DVD video player comprising:
first and second nonvolatile memories for alternately storing playback-state data indicating the operating state of the DVD video player therein whenever the playback state of the DVD video player changes; and
a last-written nonvolatile memory storage unit for storing data indicating the memory of the first and second memories to which writing the playback state data is to be applied when writing to the indicated memory is complete
wherein said playback state data is read from the memory of the first and second memories indicated by the data stored in said last-written memory storage unit and playback of the disc is performed based on the playback-state data when power for the DVD video player is turned on.

13. A DVD video playback method comprising the acts of:
writing play position data alternately to two nonvolatile memories whenever the play position data is updated during playback of a DVD video disc;
storing last-written memory data indicating the memory of said two nonvolatile memories to which writing the playback position data is to be applied when writing the play position data to the indicated memory is complete; and
when power for the DVD video player is turned on, reading the play-position data from the memory indicated by said last-written memory data whereby the DVD video disc is played back from the play position.

14. A DVD video playback method according to claim 13, wherein said play-position data comprises video object unit data in DVD video data.

15. A DVD video playback method comprising the acts of:
writing playback-mode data alternately to two nonvolatile memories whenever a playback mode is changed during playback of a DVD video disc;
storing last-written memory data indicating the memory of said two nonvolatile memories to which writing the playback mode data is to be applied after writing the playback-mode data to the indicated memory is complete; and
when power for the DVD video player is turned on, reading the playback-mode data from the memory indicated by said last-written memory data whereby the DVD video disc is played back using the playback mode.

16. The DVD video playback method of claim 15, wherein said playback-mode data is normal playback mode data, a fast-forward playback mode data, a rewinding playback mode data, or a pause playback mode data.

17. The DVD video playback method of claim 15, wherein said playback-mode data comprises data indicating a subtitle setting and a language setting of the DVD video player.

* * * * *